United States Patent
Byun

(10) Patent No.: US 10,802,286 B2
(45) Date of Patent: Oct. 13, 2020

(54) CAMERA DEVICE, DISPLAY DEVICE, AND METHOD FOR CORRECTING MOTION IN DEVICE

(71) Applicant: SAMSUNG ELECTRONICS CO., LTD., Suwon-si, Gyeonggi-do (KR)

(72) Inventor: Jeong Moon Byun, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/324,384

(22) PCT Filed: Aug. 9, 2017

(86) PCT No.: PCT/KR2017/008649
§ 371 (c)(1),
(2) Date: Feb. 8, 2019

(87) PCT Pub. No.: WO2018/030795
PCT Pub. Date: Feb. 15, 2018

(65) Prior Publication Data
US 2020/0192099 A1    Jun. 18, 2020

(30) Foreign Application Priority Data
Aug. 10, 2016    (KR) .................. 10-2016-0101657

(51) Int. Cl.
G02B 27/01    (2006.01)
G06F 3/01    (2006.01)
H04N 5/232    (2006.01)

(52) U.S. Cl.
CPC ......... *G02B 27/0172* (2013.01); *G06F 3/012* (2013.01); *H04N 5/23251* (2013.01); *H04N 5/23238* (2013.01)

(58) Field of Classification Search
CPC .............. G02B 27/0172; G06F 3/012; H04N 5/23251; H04N 5/23238
See application file for complete search history.

(56) References Cited

U.S. PATENT DOCUMENTS

7,627,194 B2    12/2009    Park
9,143,686 B2    9/2015    Lee et al.
(Continued)

FOREIGN PATENT DOCUMENTS

JP    2007-043225    2/2007
JP    2015-069445    4/2015
(Continued)

OTHER PUBLICATIONS

International Search Report dated Nov. 8, 2017 in corresponding International Application No. PCT/KR2017/008649.
(Continued)

*Primary Examiner* — Twyler L Haskins
*Assistant Examiner* — Angel L Garces-Rivera
(74) *Attorney, Agent, or Firm* — Staas & Halsey LLP

(57) ABSTRACT

An electronic device includes a camera separately capturing an omnidirectional subject depending on a specified angle to generate a plurality of split images, and generating an omnidirectional image from capturing all orientations with respect to a specified location by using the generated plurality of split images, a memory storing the generated omnidirectional image, an input device sensing an input of a user, a display, and a processor generating field of view (FOV) information corresponding to the input of the user via the input device and displaying an FOV image corresponding to the FOV information in the omnidirectional image on the display. The processor is configured to determine shaking of the omnidirectional image and to correct at least one of the FOV information and the omnidirectional image to
(Continued)

generate the FOV image, when it is determined that the shaking of the omnidirectional image is present.

13 Claims, 16 Drawing Sheets

(56) References Cited

U.S. PATENT DOCUMENTS

| | | |
|---|---|---|
| 9,319,586 B2 | 4/2016 | Spampinato et al. |
| 9,516,228 B2 | 12/2016 | Lee et al. |
| 9,787,895 B2 | 10/2017 | Rekimoto et al. |
| 2006/0034530 A1 | 2/2006 | Park |
| 2009/0207246 A1 | 8/2009 | Inami et al. |
| 2013/0088610 A1 | 4/2013 | Lee et al. |
| 2014/0204227 A1 | 7/2014 | Spampinato et al. |
| 2016/0014337 A1 | 1/2016 | Lee et al. |
| 2016/0284048 A1 | 9/2016 | Rekimoto et al. |
| 2016/0301865 A1 | 10/2016 | Rekimoto et al. |

FOREIGN PATENT DOCUMENTS

| | | |
|---|---|---|
| KR | 10-2013-0037746 | 4/2013 |
| WO | WO 2015-122108 | 8/2015 |

OTHER PUBLICATIONS

Written Opinion of the International Searching Authority dated Nov. 8, 2017 in corresponding International Application No. PCT/KR2017/008649.

CAMERA DEVICE, DISPLAY DEVICE, AND METHOD FOR CORRECTING MOTION IN DEVICE

CROSS-REFERENCE TO RELATED APPLICATIONS

This application is a National Phase application, under 35 U.S.C. § 371, of international application No. PCT/KR2017/008649 filed Aug. 9, 2017, which claims Convention Priority to Korean patent application No. 10-2016-0101657 filed Aug. 10, 2016, the entire disclosures of which are herein incorporated by reference as a part of this application.

TECHNICAL FIELD

The present disclosure relates to a camera device for correcting a shaken image, a display device and a method for correcting movement in the device.

BACKGROUND ART

Virtual reality refers to any specific environment or situation that is similar to, but is not realistic of, the reality created through an artificial technology using electronic devices. A user feels the virtual reality by using his/her sensory organ and interworks with the virtual reality to experience the virtual reality similar to the reality.

The virtual reality technology may be easily accessed by a variety of mobile devices such as a smart phone, a tablet PCs, and the like. In recent years, as a wearable device has been commercialized, the virtual reality technology has been actively studied.

A head-mounted wearable device such as a head mounted display (HMD) is present as a wearable device for implementing virtual reality. The HMD may provide an image of a see-closed type for providing virtual reality. A camera device capable of capturing 360° omnidirectional images is used to produce an image of the see-closed type of virtual reality.

DISCLOSURE

Technical Problem

Virtual reality is implemented by capturing 360° omnidirectional images at a specific location and playing the captured plurality of omnidirectional images in time order. The camera device that will shoot needs to be fixed at a specific location and in a specific direction, and a specific location where the camera shoots may be the reference point of the user input so as to play the corresponding image as a video.

When a camera device for implementing virtual reality moves to a specific location or in a specific direction without being fixed, an image not corresponding to the input of the user may be displayed on a display because the reference point of the image constituting the video frame is changed.

An aspect of the present disclosure is to provide an electronic device that recognizes movement to correct an omnidirectional image when the omnidirectional image captured by a camera device is captured while not fixed at a specific location, and a movement correction method of an electronic device.

Technical Solution

According to an embodiment of the present disclosure, an electronic device may include a camera separately capturing an omnidirectional subject depending on a specified angle to generate a plurality of split images, and generating an omnidirectional image from capturing all orientations with respect to a specified location by using the generated plurality of split images, a memory storing the generated omnidirectional image, an input device sensing an input of a user, a display, and a processor generating field of view (FOV) information corresponding to the input of the user via the input device and displaying an FOV image corresponding to the FOV information in the omnidirectional image on the display. The processor may be configured to determine shaking of the omnidirectional image and to correct at least one of the FOV information and the omnidirectional image to generate the FOV image, when it is determined that the shaking of the omnidirectional image is present.

According to an embodiment of the present disclosure, a method of correcting shaking of an image may include generating FOV information corresponding to a movement direction of a head input via an input device, determining shaking of an omnidirectional image from capturing all orientations, correcting at least one of the FOV information of the omnidirectional image and the omnidirectional image, when the shaking of the omnidirectional image is sensed, and generating an FOV image corresponding to the FOV information in the corrected omnidirectional image.

Advantageous Effects

According to various embodiments of the present disclosure, the camera device may sense (or detect) the movement of an omnidirectional image and may measure the degree of movement to rearrange coordinates, and thus the camera device may correct an image with movement so as to have coordinates similar to that of an image without movement. Moreover, the camera device may generate a video without shaking, using the corrected image.

Even though a video includes a shaken image, the display device may sense the movement of the shaken image and may measure the degree of movement to rearrange coordinates, and thus the display device may display an image similar to an image without shaking, on a display. Furthermore, the display device may display an image similar to an image without movement, on the display, by changing coordinates of field of view (FOV) or by extending the FOV to extract a common area from the temporally continuous image. Also, the display device may play a video without shaking, which includes the image of the corrected FOV, on the display.

MODE FOR INVENTION

Figure 1:
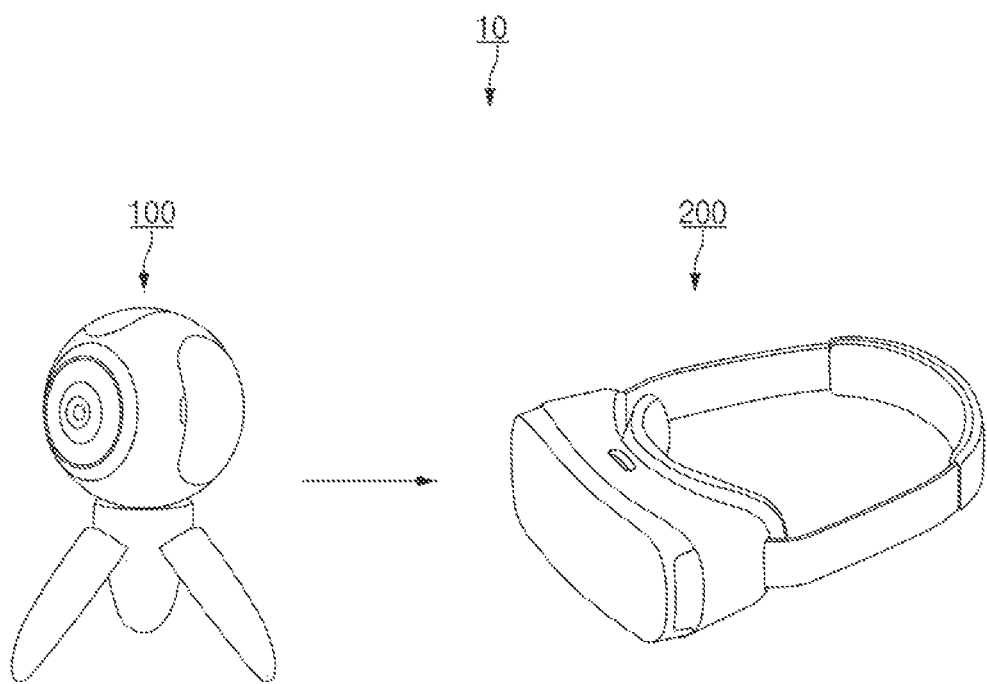
FIG. 1 is a view illustrating a virtual reality system, according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing from the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

FIG. 1 is a view illustrating a virtual reality system, according to various embodiments.

Referring to FIG. 1, a virtual reality system 10 may include a camera device 100 and a display device 200.

According to an embodiment, the camera device 100 may capture an omnidirectional subject with the camera device 100 as the center to generate the omnidirectional image. For example, the camera device 100 may include a plurality of optical modules so as to capture all orientations. The plurality of images captured by the plurality of optical modules may be generated as the omnidirectional image.

According to an embodiment, the camera device 100 may generate an omnidirectional video by arranging the omnidirectional image in time order.

The omnidirectional image included in the omnidirectional video may constitute image frames of a video.

According to an embodiment, the display device 200 may display the omnidirectional image captured by the camera device 100, on a display. For example, the display device 200 may receive the input of a user to display an image of the range corresponding to the corresponding input, on the display. For example, the display device 200 may be a HMD worn on the user's head. The HMD may receive the movement direction of the user's head and may generate information about FOV corresponding to the movement direction of the head to display the image of the area corresponding to the FOV in the omnidirectional image on the display.

According to an embodiment, the display device 200 may play a FOV video by displaying an image of an area corresponding to the FOV information in the omnidirectional image in time order. The image corresponding to the FOV information may constitute the image frame of the FOV video.

As such, the camera device 100 may generate the omnidirectional image and the omnidirectional video, and the display device 200 may implement virtual reality by playing an image and a video corresponding to the FOV information.

Figure 2:
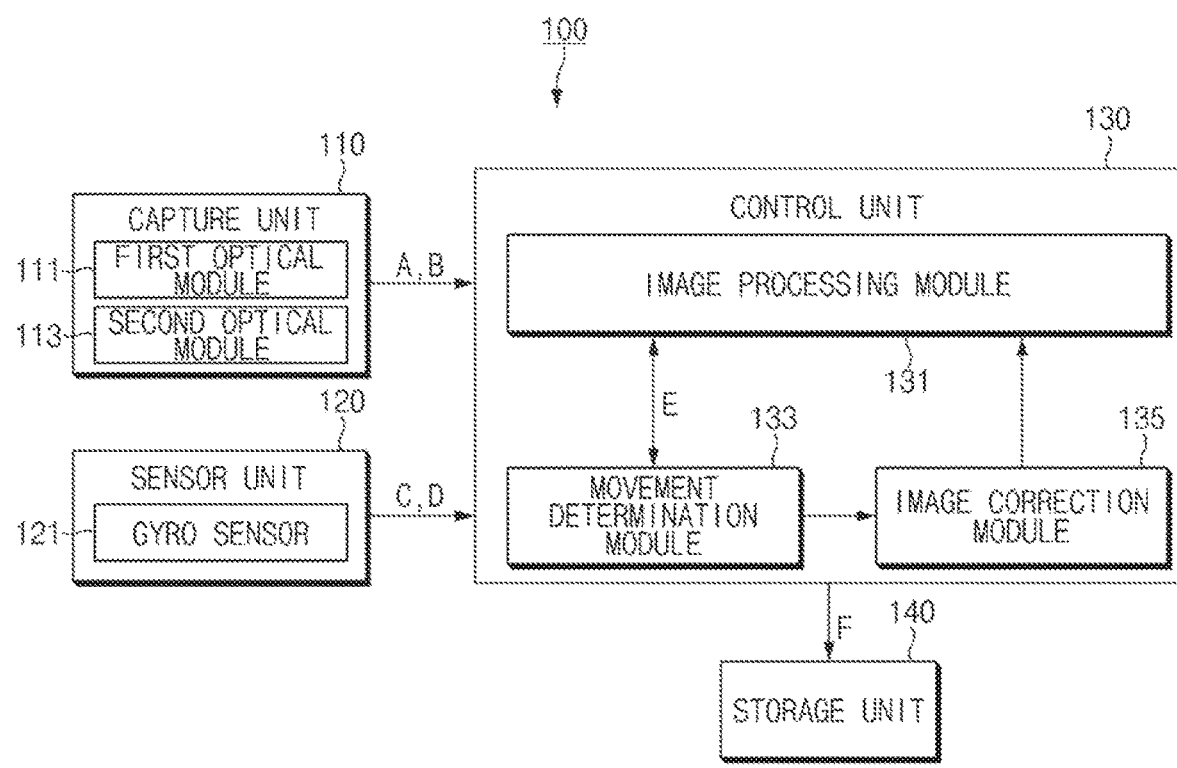
FIG. 2 is a block diagram illustrating a configuration of a camera device, according to various embodiments.

FIG. 2 is a block diagram illustrating a configuration of a camera device, according to various embodiments.

Referring to FIG. 2, the camera device 100 may include a capture unit 110, a sensor unit 120, a control unit 130, and a storage unit 140.

The capture unit 110 may include a plurality of optical modules 111 and 113 so as to capture an omnidirectional subject. For example, the optical modules 111 and 113 may include an optical system for focusing on an optical signal, an aperture, and a shutter. The optical system may include a focus lens that adjusts a focus, a zoom lens that adjusts the focal length, and the location of the lens may be adjusted by a lens driver. The aperture may adjust a throttling amount by an aperture driver. The shutter may adjust opening and closing of the shutter by a shutter driver.

According to an embodiment, the capture unit 110 may include the first optical module 111 and the second optical module 113. The first optical module 111 and the second optical module 113 may capture a subject depending on a specified angle. For example, the first optical module 111 may capture a subject of a first angle toward the front of the camera device 100, and the second optical module 113 may capture a subject of a second angle toward the rear of the camera device 100. When the first optical module 111 and the second optical module 113 capture the subject at the first angle and the subject at the second angle, the capture unit 110 may capture an omnidirectional subject. For example, the capture ranges of the first optical module 111 and the second optical module 113 may overlap with each other. The omnidirectional image may be securely generated by overlapping with capture ranges of the first optical module 111 and the second optical module 113.

According to an embodiment, the capture unit 110 may further include an image sensor, a signal control circuit, and an analog digital convertor (ADC), which will process images captured by the optical modules 111 and 113. The image sensor may convert the optical image of a subject input from the optical modules 111 and 113 into an electrical signal. For example, the image sensor may be a charge coupled device (CCD) or a complementary metal-oxide semiconductor (CMOS). The signal control circuit may control the electrical signal input from the image sensor to the ADC. For example, the signal control circuit may include a sample & hold (S/H) circuit and an automatic gain control (AGC) circuit. The ADC may convert the analog signal to a digital signal. The converted digital signal may include information about an image. For example, the digital image may include a first image A corresponding to the optical image captured by the first optical module 111 and a second image B corresponding to the optical image captured by the second optical module 113. The first image A and the second image B may include images of the front and rear of the camera device 100, respectively. The first image A and the second image B may be transmitted to the control unit 130.

The sensor unit 120 may include a sensor capable of sensing the movement of the camera device 100. For example, the sensor unit 120 may be a gyro sensor 121. The gyro sensor 121 may sense rotational movement about the coordinate axis and horizontal movement of the coordinate axis direction. For example, the rotational movement may include rotational movement on each of the x-axis, y-axis, and z-axis. For example, the horizontal movement may include horizontal movement of each of x-axis direction, y-axis direction, and z-axis direction.

According to an embodiment, the sensor unit 120 may further include an ADC capable of converting the movement sensed by the gyro sensor 121 into a digital signal. The digital signal may include information about the movement of the camera device 100. For example, the information about the movement may include rotational movement C and horizontal movement D. The rotational movement C and the horizontal movement D may be transmitted to the control unit 130.

The control unit 130 may generate the image transmitted from the capture unit 110, as omnidirectional images E and F and an omnidirectional video. The omnidirectional video may be generated using the omnidirectional image. The control unit 130 may correct the omnidirectional images E and F, using the movement sensed by the sensor unit 120.

According to various embodiments, the control unit 130 may include an image processing module 131, a movement determination module 133, and an image correction module 135. The components of the control unit 130 may be a separate hardware module or may be a software module implemented by at least one processor. For example, the function of each of the modules included in the control unit 130 may be performed by one processor or may be performed by each separate processor.

According to an embodiment, the image processing module 131 may generate the omnidirectional images E and F, using the first image A and the second image B. For example, the image processing module 131 may receive the first image A and the second image B from the capture unit 110. The image processing module 131 may stitch the received first image A and the received second image B to generate an image displayed in three-dimensional coordinates. For example, the image displayed in three-dimensional coordinates may be a spherical omnidirectional image E disposed on a spherical surface. The image processing module 131 may spread the spherical omnidirectional image E to generate the two-dimensional planar omnidirectional image F. The image processing module 131 may arrange the planar omnidirectional image F in time order to generate the omnidirectional video.

According to an embodiment, the image processing module 131 may correct the omnidirectional images E and F, in each of which shaking is detected by the movement determination module 133. For example, the image processing module 131 may correct the omnidirectional images E and F under control of the image correction module 135.

According to an embodiment, the image processing module 131 may store the planar omnidirectional image F in the storage unit 140 and may transmit the planar omnidirectional image F to the outside of the camera device 100.

The movement determination module 133 may determine the shaking of the omnidirectional images E and F. For example, the movement determination module 133 may receive information about the rotational movement C and the horizontal movement D from the sensor unit 120 to determine the shaking. For another example, the movement determination module 133 may receive the spherical omnidirectional image E from the image processing module 131 and may determine the shake upon capturing the spherical omnidirectional image E by comparing the spherical omnidirectional image E temporally continuously captured among the received image. For the purpose of determining the movement of the spherical omnidirectional image E, for example, the movement determination module 133 may determine the shaking by comparing pixel values of a plurality of coordinates in the temporally continuously captured spherical omnidirectional image. For another example, for the purpose of determining the movement of the omnidirectional image E, the movement determination module 133 may determine the shaking by comparing a subject (e.g., a mountain, a tree, building, or the like) without the movement of the temporally continuously captured spherical omnidirectional image E. Accordingly, the movement determination module 133 may determine whether the omnidirectional images E and F are shaken, and may determine movement quantity (e.g., a moving distance) of the omnidirectional images E and F.

When the movement determination module 133 determines that the shaking of the omnidirectional images E and F is present, the image correction module 135 may control the image processing module 131 to correct the spherical omnidirectional image E in which the shaking is detected. For example, the image correction module 135 may receive information about movement from the movement determination module 133. The image correction module 135 may correct the spherical omnidirectional image E in which the shaking is detected, by rearranging a coordinate axis depending on the amount of movement included in the information about the movement.

According to an embodiment, the storage unit 140 may store the planar omnidirectional image F and the omnidirectional video, which are transmitted from the control unit 130. For example, the storage unit 140 may include memory (e.g., a nonvolatile memory such as a flash memory, a hard disk, or the like).

Figure 3:
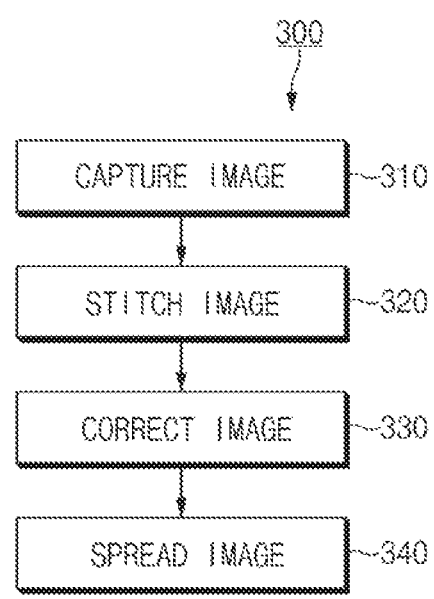
FIG. 3 is a flowchart illustrating a method of correcting shaking of an image of a camera device, according to various embodiments.

FIG. 3 is a flowchart illustrating a method of correcting shaking of an image of a camera device, according to various embodiments.

According to an embodiment, in operation 310, the camera device 100 may separately capture an omnidirectional subject and may capture (or photograph) a plurality of images, which are separately captured. For example, the capture unit 110 of the camera device 100 may generate a first image A and a second image B.

According to an embodiment, in operation 320, the camera device 100 may stitch the boundary of the captured image to generate a three-dimensional spherical omnidirectional image E. For example, the image processing module 131 of the camera device 100 may generate an image, using the first image A and the second image B.

According to an embodiment, in operation 330, the camera device 100 may correct an image, in which shaking is sensed, in the spherical omnidirectional image E. For example, the image correction module 135 of the camera device 100 may rearrange the coordinate axis of the spherical omnidirectional image E to correct the coordinate axis of the spherical omnidirectional image E similarly to the coordinates of an image without the shaking.

According to an embodiment, in operation 340, the camera device 100 may spread the spherical omnidirectional image E to generate the two-dimensional planar omnidirectional image F.

Figure 4:
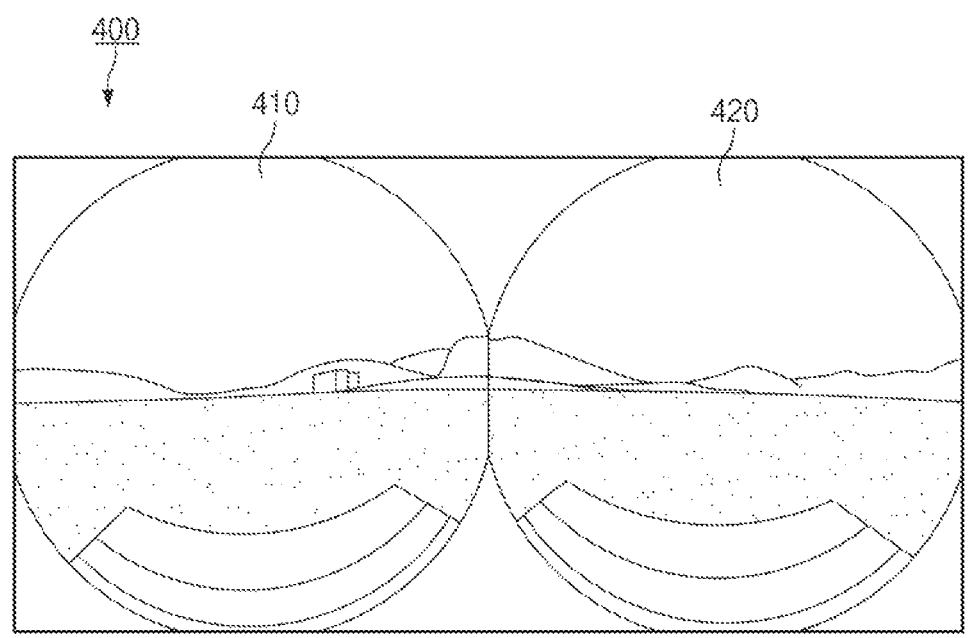
FIG. 4 is a view illustrating an image captured by a capture unit, according to an embodiment.

FIG. 4 is a view illustrating an image captured by a capture unit, according to an embodiment.

Referring to FIG. 4, in operation 310 of FIG. 3, the capture unit 110 may generate an image 400 from capturing an omnidirectional subject. For example, the image 400 from capturing the omnidirectional subject may include a first image 410 and a second image 420, which are respectively captured by the first optical module 111 and the second optical module 113.

Figure 5A:
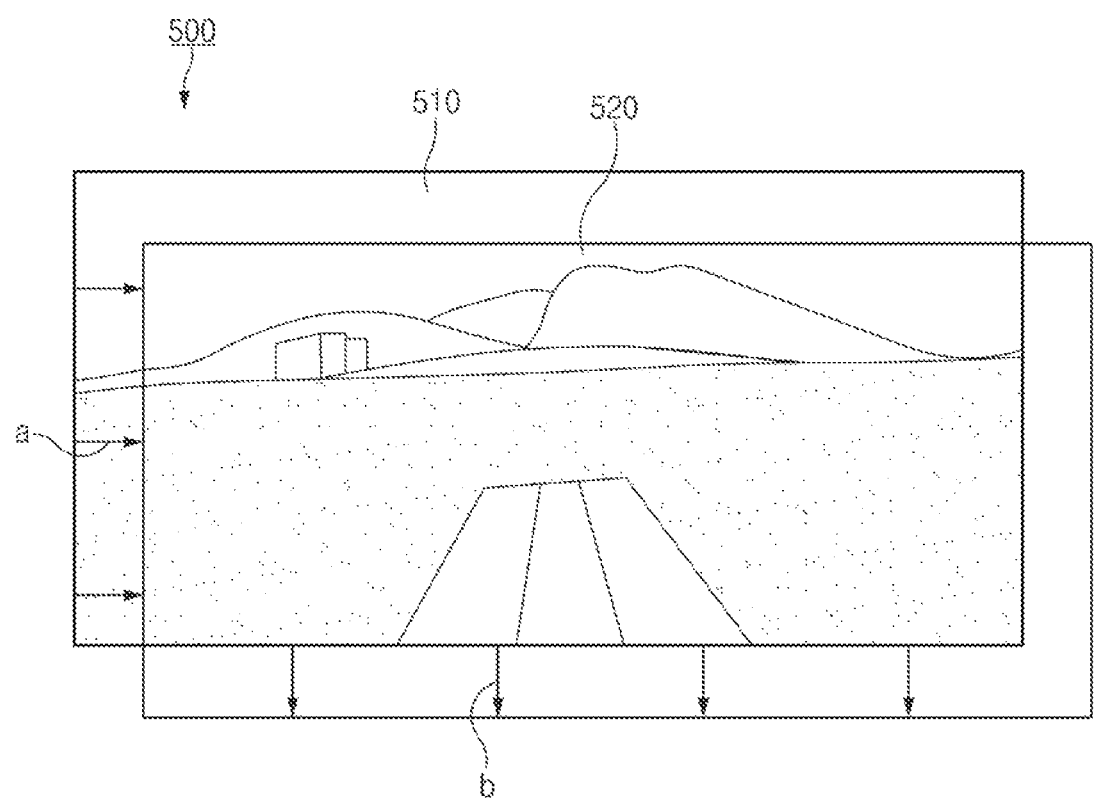
FIG. 5A is a view illustrating that an omnidirectional image of a camera device is shaken, according to an embodiment.

FIG. 5A is a view illustrating that an omnidirectional image of a camera device is shaken, according to an embodiment.

Referring to FIG. 5A, in operation 320 of FIG. 3, the image processing module 131 may stitch the boundary between the first image 410 and the second image 420 to generate a three-dimensional spherical omnidirectional image 500. For example, the spherical omnidirectional image 500 may include a first spherical omnidirectional image 510 and a second spherical omnidirectional image 520. The first spherical omnidirectional image 510 and the second spherical omnidirectional image 520 may be images captured temporally continuously. For example, the coordinates of the second spherical omnidirectional image 520 may move to the width 'a' and the length 'b' depending on the movement of the camera device 100 during shooting.

Accordingly, in the first spherical omnidirectional image 510 and the second spherical omnidirectional image 520, different images may be displayed at the same coordinates.

Figure 5B:
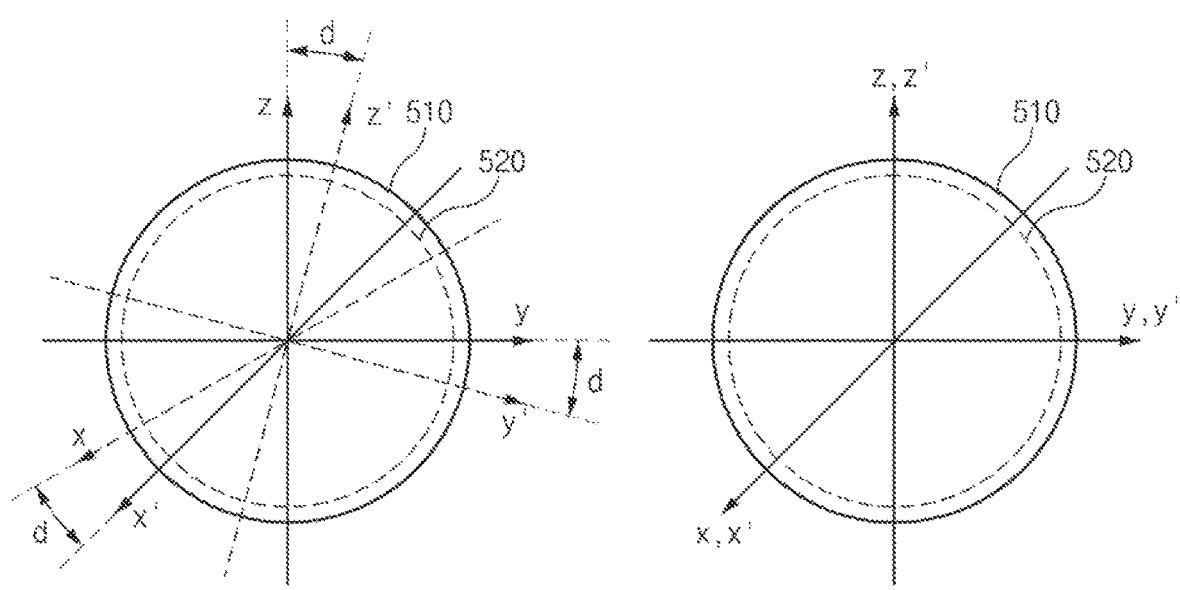
FIG. 5B is a view illustrating rearranging a coordinate axis of an image in which a camera device is shaken, according to an embodiment.

FIG. 5B is a view illustrating rearranging a coordinate axis of an image in which a camera device is shaken, according to an embodiment.

Referring to FIG. 5B, in operation 330 of FIG. 3, the image correction module 135 may arrange the coordinate axis of the second spherical omnidirectional image 520 with shaking during shooting to correct the coordinate axis of the second spherical omnidirectional image 520, similarly to the first spherical omnidirectional image 510 without shaking during shooting. For example, the image correction module 135 may move the coordinate axis (x', y', z') of the second spherical omnidirectional image 520 to the coordinate axis (x, y, z) of the first spherical omnidirectional image 510 by 'd' in consideration of the movement of the camera device 100 during shooting. In other words, the image processing module 131 may correct the coordinate axis (x', y', z') of the second spherical omnidirectional image 520 so as to be the same as the coordinate axis (x, y, z) of the first spherical omnidirectional image 510. Accordingly, in a corrected second spherical omnidirectional image 520', an image the same as the first spherical omnidirectional image 510 may be displayed at the same coordinates.

Figure 6:
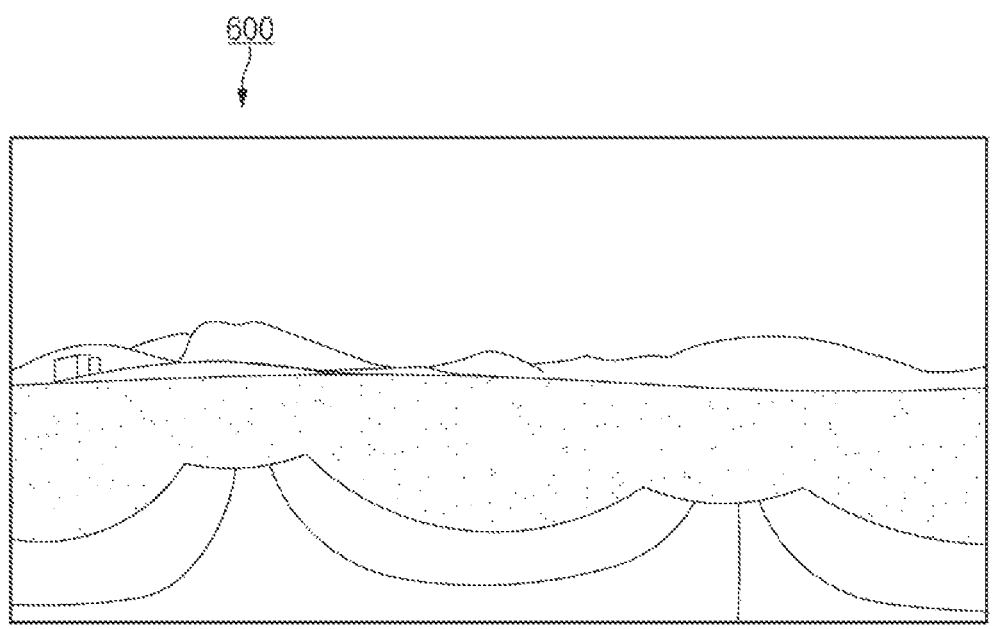
FIG. 6 is a view illustrating that a camera device spreads a corrected image, according to an embodiment.

FIG. 6 is a view illustrating that a camera device spreads a corrected image, according to an embodiment.

Referring to FIG. 6, in operation 340 of FIG. 3, the image processing module 131 may stitch the boundary between the first spherical omnidirectional image 510 and the corrected second spherical omnidirectional image 520' to generate a two-dimensional planar omnidirectional image 600. According to an embodiment, the image processing module 131 may arrange the planar omnidirectional image 600 in time order to generate an omnidirectional video.

The camera device 100 according to an embodiment of the present disclosure may sense the shaking of an omnidirectional image and may measure the degree of movement to rearrange coordinates, and thus the camera device may correct an image with shaking so as to have coordinates similar to that of an image without shaking. Moreover, the camera device 100 may generate a video without shaking, using the corrected image.

Figure 7:
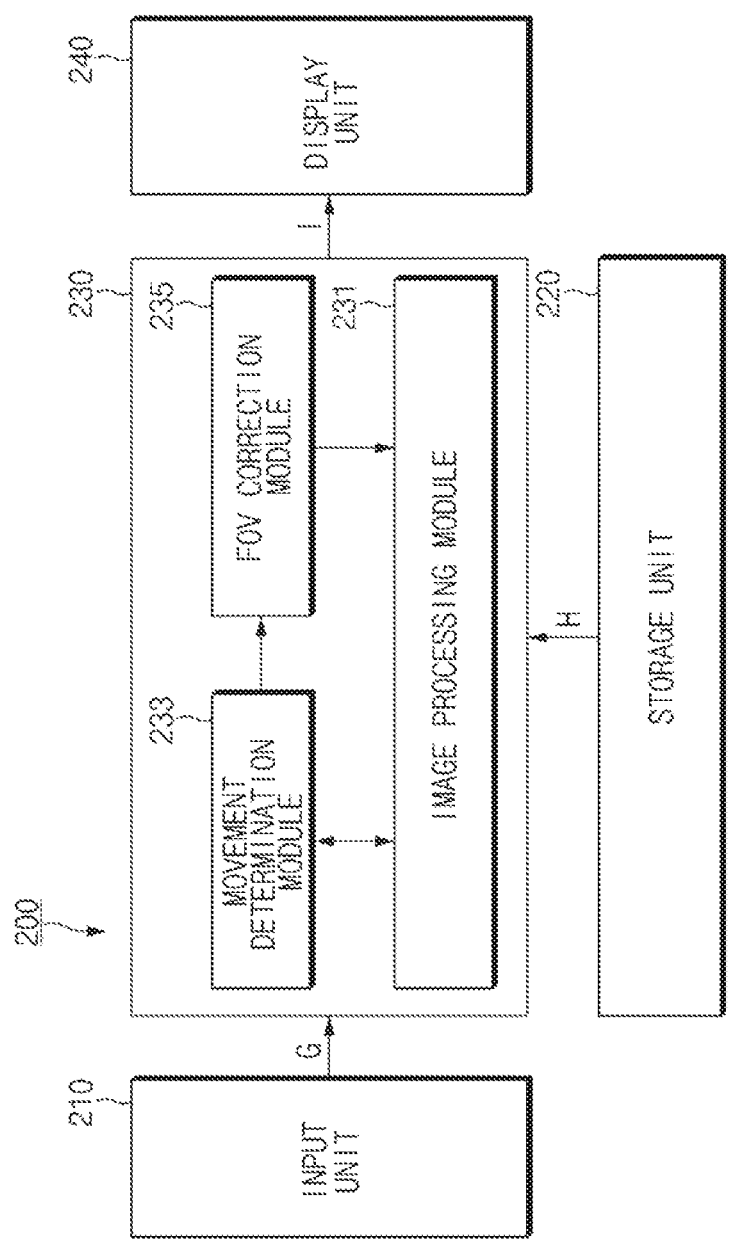
FIG. 7 is a block diagram illustrating a configuration of a display device, according to various embodiments.

FIG. 7 is a block diagram illustrating a configuration of a display device, according to various embodiments.

Referring to FIG. 7, the display device 200 may include an input unit 210, a storage unit 220, a control unit 230, and a display unit 240.

The input unit (or an input device) 210 may sense the input of a user and may transmit input information of the user to the control unit 230. For example, the input unit 210 may use a gyro sensor to sense the input of the user. The input of the user may be the movement direction G of the user's head. For example, the movement direction G of the user's head may be the direction that the front side of the user's head faces.

The storage unit (or a memory) 220 may store an omnidirectional image H. For example, the omnidirectional image H may be a two-dimensional planar omnidirectional image from spreading a three-dimensional spherical omnidirectional image. For example, the storage unit 220 may include memory (e.g., a nonvolatile memory such as a flash memory, a hard disk, or the like).

The control unit 230 may include an image processing module 231, a movement determination module 233, and a FOV correction module 235. The components of the control unit 230 may be a separate hardware module or may be a software module implemented by at least one processor. For example, the function of each of the modules included in the control unit 230 may be performed by one processor or may be performed by each separate processor.

According to an embodiment, the image processing module 231 may receive the movement direction G of the user's head from the input unit 210 to generate the corresponding FOV information. The FOV information may include information for extracting FOV image I to be displayed on the display unit 240, from the omnidirectional image H. For example, the FOV information may include information about FOV composed of a coordinate value.

According to an embodiment, the image processing module 231 may extract the FOV image I from the omnidirectional image H. For example, the image processing module 231 may receive information about the omnidirectional image H, from the storage unit 220. The image processing module 231 may decode the generated the FOV information to extract the FOV image I from the omnidirectional image H.

According to an embodiment, the image processing module 231 may perform processing for improving the image quality of the extracted FOV image I. For example, the processing for improving the image quality may be noise rejection (NR), DE-FOG, color correction, frame rate conversion (FRC), stabilization, or the like.

According to an embodiment, the movement determination module 233 may determine the movement of the omnidirectional image H. For example, the movement determination module 233 may receive movement information (e.g., rotational movement or horizontal movement) from the image processing module 231 and may verify the information to determine the movement when capturing the omnidirectional image H. The movement information may be included in metadata of the omnidirectional image H received from the storage unit 220 to the image processing module 231. For another example, the movement determination module 233 may receive the omnidirectional image H from the image processing module 231 and may determine the movement of the omnidirectional image H by comparing the temporally continuously captured omnidirectional image H. For example, for the purpose of determining the shaking of the omnidirectional image H, the movement determination module 233 may determine the shaking by comparing pixel values of a plurality of coordinates in the temporally continuously captured omnidirectional image H. For another example, for the purpose of determining the shaking of the omnidirectional image H, the movement determination module 233 may determine the shaking by comparing a subject (e.g., a mountain, a tree, building, or the like) without the movement of the temporally continuously captured omnidirectional image H. Accordingly, the movement determination module 233 may determine whether the omnidirectional image H is shaken, and may determine movement quantity (e.g., a moving distance) of the omnidirectional image H.

According to an embodiment, when the movement determination module 233 determines that the shaking of the omnidirectional image H is present, the FOV correction module 235 may control the image processing module 231 to correct the omnidirectional image H. For example, the FOV correction module 235 may correct the omnidirectional image H in which the shaking is detected, by rearranging a coordinate axis depending on the amount of movement included in the information about the movement. For another example, while maintaining the coordinate axis of the omnidirectional image H, the FOV correction module 235 may change the coordinates of FOV included in the FOV information, depending on the amount of movement. For still another example, while maintaining the coordinate axis of the omnidirectional image H, the FOV correction module 235 may enlarge the FOV included in the FOV information, depending on the amount of movement. The FOV correction module 235 may extract the common area from the enlarged FOV of the temporally continuously captured omnidirectional image H to generate the corrected FOV image I. For example, the FOV correction module 235 may determine the shaking by comparing a subject without movement in the temporally continuously captured omnidirectional image G. According to an embodiment, the FOV correction module 235 may correct at least one of the FOV information and the omnidirectional image H.

The FOV image I extracted by the image processing module 231 of the control unit 230 may be displayed on the display unit (or a display) 240. According to an embodiment, when the FOV image H is displayed on the display unit 240 in time order, a FOV video may be played. The FOV image H may be the image frame of the FOV video.

Figure 8:
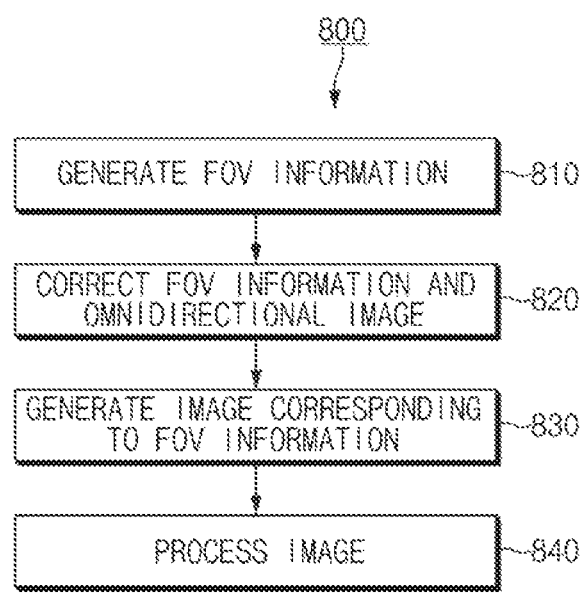
FIG. 8 is a flowchart illustrating a method of correcting movement of an image in a display device, according to various embodiments.

FIG. 8 is a flowchart illustrating a method of correcting movement of an image in a display device, according to various embodiments.

According to an embodiment, in operation 810, the display device 200 may generate FOV information corresponding to a head's movement direction input through the input unit 210.

According to an embodiment, in operation 820, the display device 200 may correct at least one of the FOV information of the image, in which shaking is sensed (or detected), and the omnidirectional image H. For example, the FOV correction module 235 of the display device 200 may rearrange the coordinates of the omnidirectional image H. For another example, the FOV correction module 235 of the display device 200 may change the coordinates of FOV included in the FOV information. For still another example, the FOV correction module 235 of the display device 200 may enlarge the FOV included in the FOV information and may extract the common area of the enlarged image to generate the FOV image I.

According to an embodiment, in operation 830, the display device 200 may extract the FOV image I corresponding to the FOV from the omnidirectional image H.

According to an embodiment, in operation 840, the display device 200 may improve the image quality of the FOV image I.

According to another embodiment, before operation 820, the display device 200 may determine the shaking of an omnidirectional image. For example, the display device 200 may determine the shaking of the omnidirectional image, using movement information of the omnidirectional image included in metadata of the omnidirectional image. For another example, the display device 200 may determine the shaking of the omnidirectional image by comparing the omnidirectional image captured temporally continuously. The display device 200 may compare at least one of a subject without movement and pixel values of a plurality of coordinates in the temporally continuously captured omnidirectional image.

Figure 9A:
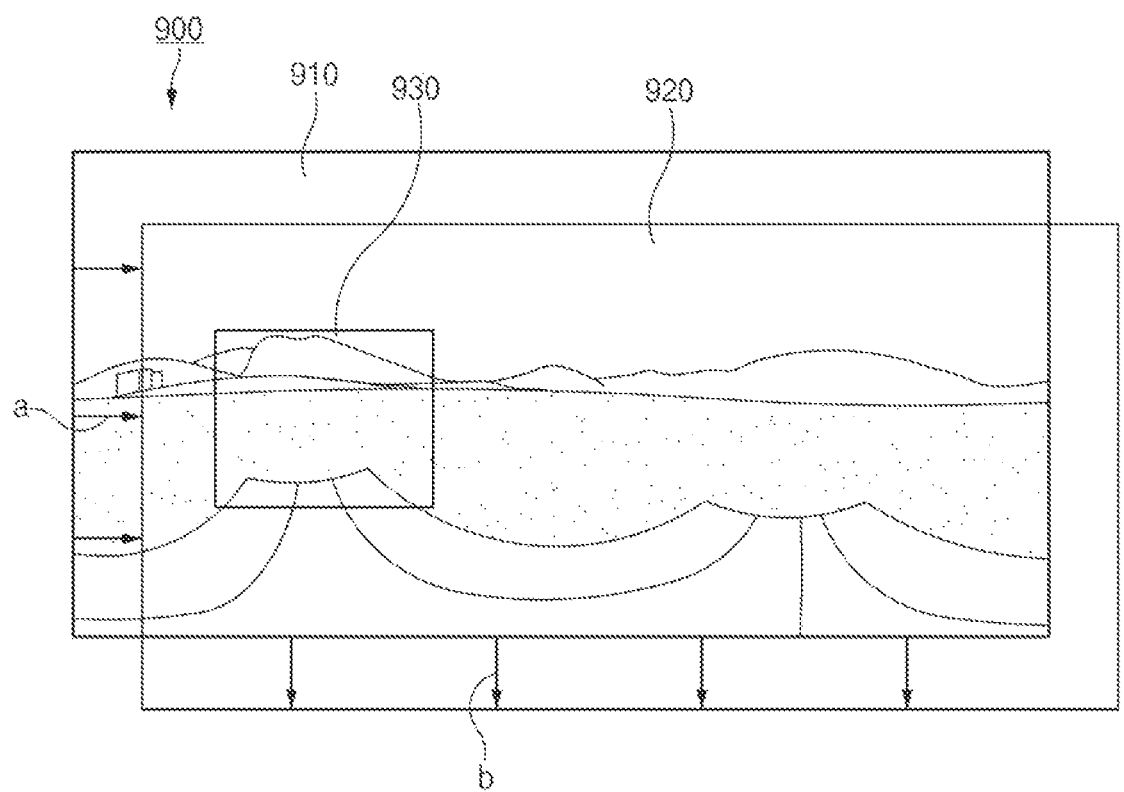
FIG. 9A is a view illustrating a shaken image of a display device, according to an embodiment.

FIG. 9A is a view illustrating a shaken image of a display device, according to an embodiment.

Referring to FIG. 9A, in operation 810 of FIG. 8, the image processing module 231 may generate FOV information corresponding to a head's movement direction G of an input unit in an omnidirectional image 900. FOV 930 may be included in the FOV information. For example, the omnidirectional image 900 may include a first planar omnidirectional image 910 and a second planar omnidirectional image 920. The first planar omnidirectional image 910 and the second planar omnidirectional image 920 may be images captured temporally continuously. For example, it may be sensed (or detected) that the coordinates of the second planar omnidirectional image 920 have moved to the width 'a' and the length 'b' in the second planar omnidirectional image 920. Accordingly, in the first planar omnidirectional image 910 and the second planar omnidirectional image 920, different images may be displayed at the same FOV 930.

Figure 9B:
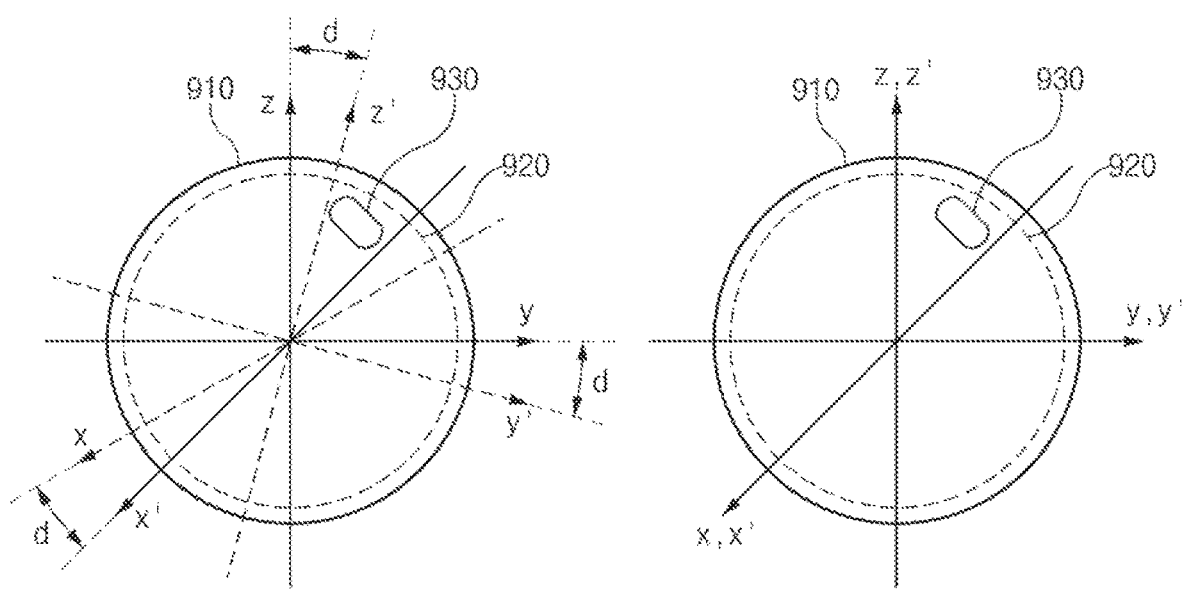
FIG. 9B is a view illustrating that a display device rearranges and corrects a coordinate axis of a shaken image, according to an embodiment.

FIG. 9B is a view illustrating that a display device rearranges and corrects a coordinate axis of a shaken image, according to an embodiment.

Referring to FIG. 9B, in operation 820 of FIG. 8, the FOV correction module 235 may rearrange the coordinate axis of the second planar omnidirectional image 920, in which shaking is sensed (or detected), to correct the coordinate axis of the second planar omnidirectional image 920, similarly to the coordinates of the first planar omnidirectional image 910, in which shaking is not sensed. For example, the FOV correction module 235 may move the coordinate axis (x', y', z') of the second planar omnidirectional image 920 to the coordinate axis (x, y, z) of the first planar omnidirectional image 910 by 'd' depending on the movement of an image. In other words, the FOV correction module 235 may correct the coordinate axis (x', y', z') of the second planar omnidirectional image 920 so as to be the same as the coordinate axis (x, y, z) of the first planar omnidirectional image 910. Accordingly, in a corrected second planar omnidirectional image 920', the same image may be displayed in the same FOV as the first planar omnidirectional image 910.

Figure 10A:
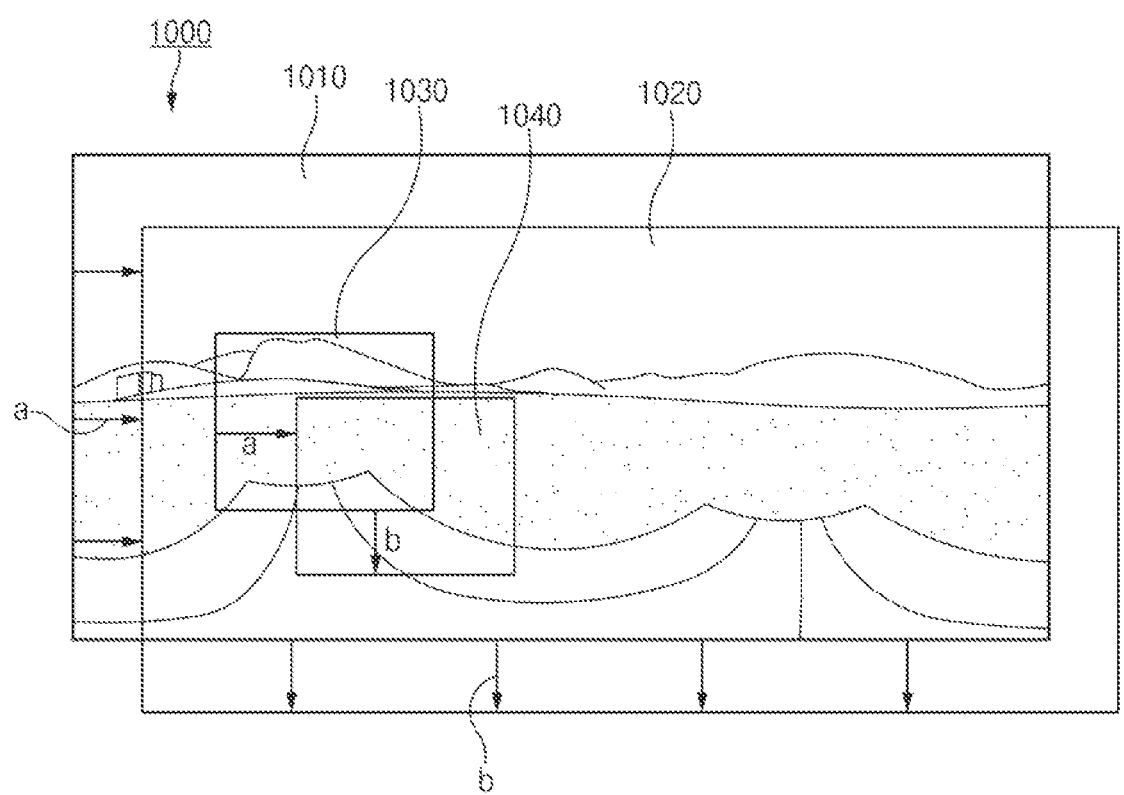
FIG. 10A is a view illustrating a shaken image of a display device, according to an embodiment.

FIG. 10A is a view illustrating a shaken image of a display device, according to an embodiment.

Referring to FIG. 10A, in operation 810 of FIG. 8, the image processing module 231 may generate FOV 1030 corresponding to a head's movement direction G of an input unit in an omnidirectional image 1000. For example, the omnidirectional image 1000 may include a first planar omnidirectional image 1010 and a second planar omnidirectional image 1020. The first planar omnidirectional image 1010 and the second planar omnidirectional image 1020 are similar to the first planar omnidirectional image 910 and the planar omnidirectional image 920, respectively. For example, the second planar omnidirectional image 1020 may extract an image by using a corrected FOV 1040.

Figure 10B:
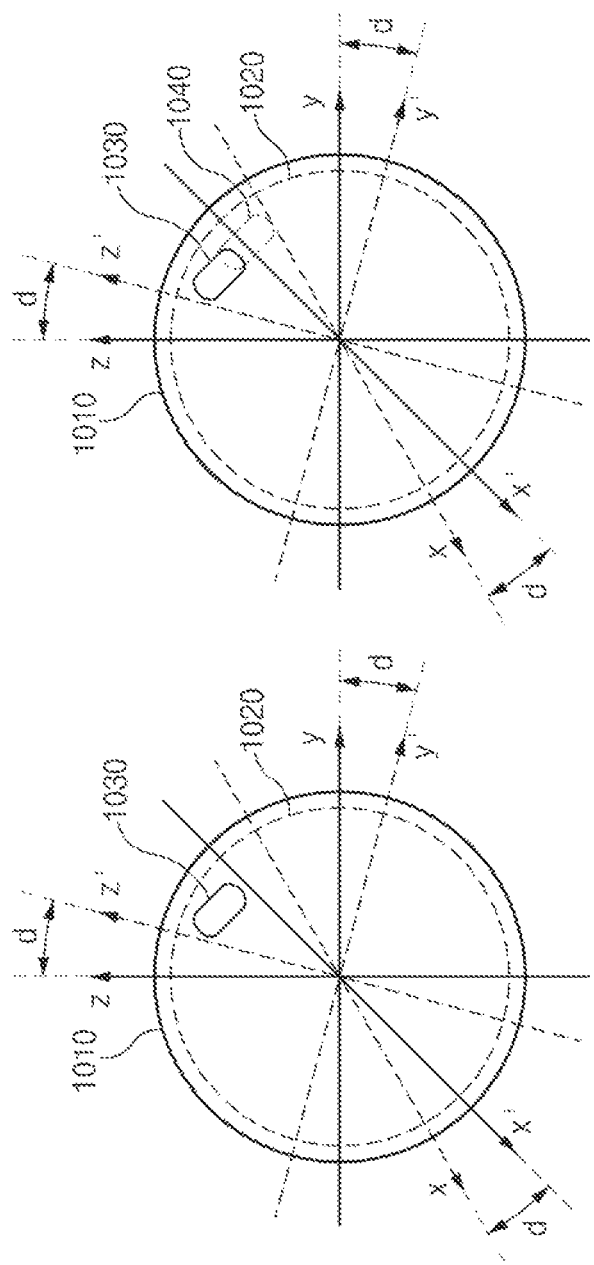
FIG. 10B is a view illustrating that a display device rearranges and corrects coordinates of FOV of a shaken image, according to an embodiment.

FIG. 10B is a view illustrating that a display device rearranges and corrects coordinates of FOV of a shaken image, according to an embodiment.

Referring to FIG. 10B, in operation 820 of FIG. 8, the FOV correction module 235 may correct FOV 1030 of the second planar omnidirectional image 1020, in which shaking is sensed (or detected). For example, the FOV correction module 235 may maintain the coordinate axis (x', y', z') of the second planar omnidirectional image 1020 as it is, and may change the FOV 1030 depending on the shaking of an image to generate the corrected FOV 1040. Accordingly, in an image in the FOV 1040 corrected in the second planar omnidirectional image 1020, an image the same as an image in the FOV 1030 may be displayed in the first planar omnidirectional image 1010.

Figure 11A:
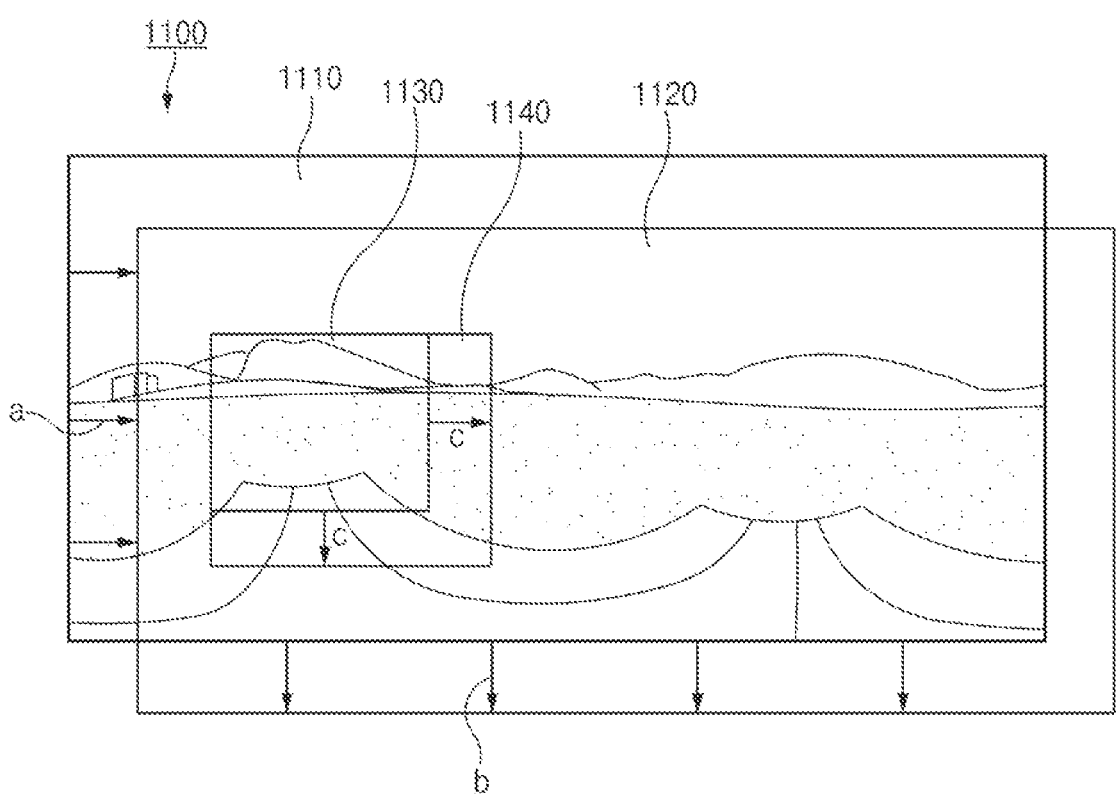
FIG. 11A is a view illustrating a shaken image of a display device, according to an embodiment.

FIG. 11A is a view illustrating a shaken image of a display device, according to an embodiment.

Referring to FIG. 11A, in operation 810 of FIG. 8, the image processing module 231 may generate FOV information corresponding to a head's movement direction G of an input unit in an omnidirectional image 1100. The FOV information may include FOV 1130. For example, the omnidirectional image 1100 may include a first planar omnidirectional image 1110 and a second planar omnidirectional image 1120. The first planar omnidirectional image 1110 and the second planar omnidirectional image 1120 are similar to the first planar omnidirectional image 910 and the second planar omnidirectional image 920, respectively. For example, the first planar omnidirectional image 1110 and the second planar omnidirectional image 1120 may generate FOV again, using enlarged 'c' FOV 1140.

Figure 11B:
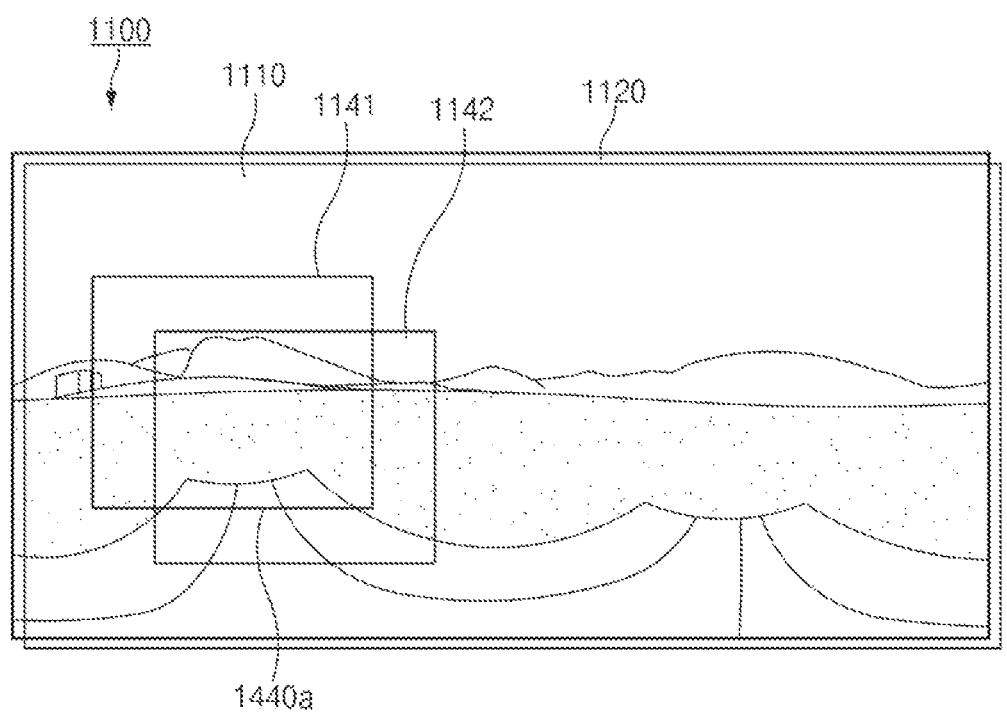
FIG. 11B is a view illustrating that a display device enlarges and corrects FOV of a shaken image, according to an embodiment.

FIG. 11B is a view illustrating that a display device enlarges and corrects FOV of a shaken image, according to an embodiment.

Referring to FIG. 11B, in operation 820 of FIG. 8, the FOV correction module 235 may correct the FOV 1130 of the first planar omnidirectional image 1110 and the second planar omnidirectional image 1120. For example, the FOV correction module 235 may maintain the coordinate axis (x', y', z') of the second planar omnidirectional image 1120 as it is, and may enlarge the FOV 1130 depending on the shaking of an image. The FOV correction module 235 may generate a portion 1140a, which includes the same image, from among enlarged FOV 1141 of the first planar omnidirectional image 1110 and enlarged FOV 1142 the second planar omnidirectional image 1120 as a corrected FOV image I. As such, the image of the portion 1140a, which includes the same image, from among the enlarged FOV 1141 of the first planar omnidirectional image 1110 and the enlarged FOV 1142 of the second planar omnidirectional image 1120 may be the same as an image generated in the FOV 1130 before correcting the first planar omnidirectional image 1110.

According to another embodiment, an electronic device may include a camera, a memory, an input device, a display, and a processor. For example, the electronic device may further include the camera in the display device 200 in FIG. 7. The camera, the memory, and the processor (or the processor including an image processing module) of the electronic device may be similar to the capture unit 110, the storage unit 140, and the control unit 130 (e.g., the image processing module 131) of the camera device 100 in FIG. 2, respectively.

According to an embodiment, the camera may separately capture an omnidirectional subject depending on a specified angle to generate a plurality of split images, and may capture an omnidirectional image from capturing all orientations with respect to a specified location by using the generated a plurality of split images.

According to an embodiment, the memory may store the generated omnidirectional image. For example, the memory may be similar to the storage unit 220 of FIG. 7.

According to an embodiment, the input device may sense an input of a user. For example, the input device may be similar to the input unit 210 of FIG. 7.

According to an embodiment, the display may display an image corresponding to a user input, in an omnidirectional image. For example, the display may be similar to the display unit 240 of FIG. 7.

According to an embodiment, the processor may generate FOV information corresponding to the input of the user via the input device and may display an FOV image corresponding to the FOV information in the omnidirectional image on a display. For example, the processor may be similar to the control unit 230 of FIG. 7.

According to an embodiment, the processor may determine the shaking of the omnidirectional image. For example, the processor may determine the shaking of the omnidirectional image, using movement information of the omnidirectional image included in metadata of the omnidirectional image. For another example, the processor may determine the shaking of the omnidirectional image by comparing the omnidirectional image captured temporally continuously. For example, the processor may determine the shaking by comparing pixel values of a plurality of coordinates in the temporally continuously captured plurality of omnidirectional images. For example, the processor may determine the shaking by comparing a subject without movement in the temporally continuously captured plurality of omnidirectional images.

According to an embodiment, the processor may correct at least one of the FOV information and the omnidirectional image to generate the FOV image, when it is determined that the shaking of the omnidirectional image is present. The processor may perform the correction depending on the determined shaking. For example, the processor may perform the correction for rearranging a coordinate axis of the omnidirectional image depending on the shaking of the omnidirectional image. For another example, the processor may perform the correction for changing coordinates of FOV included in the FOV information depending on the shaking of the omnidirectional image. According to another embodiment, the processor may enlarge FOV included in the FOV information depending on the shaking of the omnidirectional image and may perform the correction for extracting a common area of the enlarged FOV in the omnidirectional image captured temporally continuously.

Figure 12:
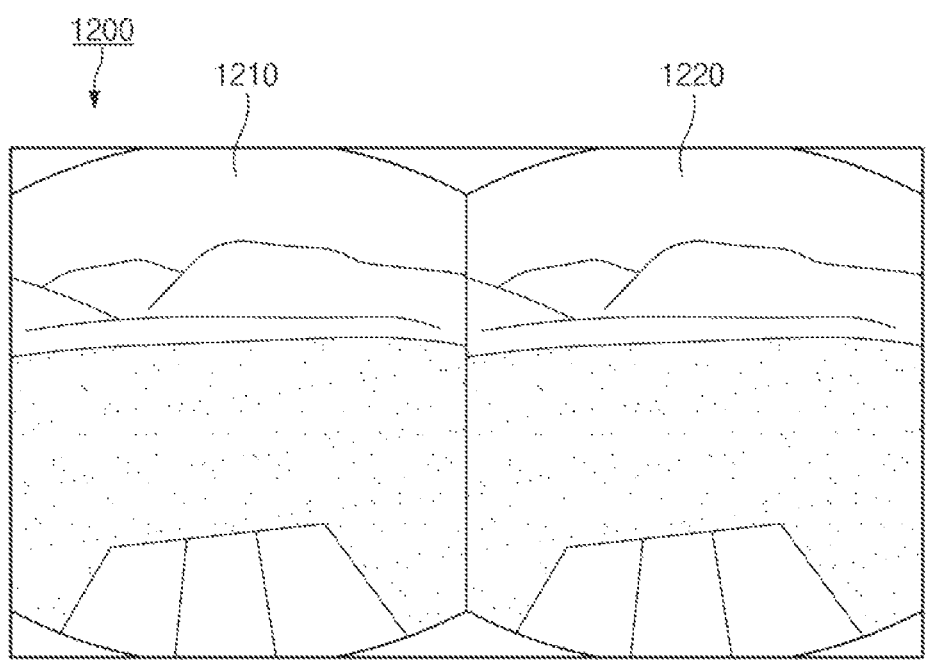
FIG. 12 is a view illustrating an image displayed on a display of a display device, according to various embodiments.

FIG. 12 is a view illustrating an image displayed on a display of a display device, according to various embodiments.

Referring to FIG. 12, in operation 830 of generating an image in FOV of FIG. 8, the image processing module 231 may display an FOV image 1200 on the display unit 240. The FOV image 1200 may include a first FOV image 1210 and a second FOV image 1220 for the purpose of providing a user with virtual reality. The first FOV image 1210 and the second FOV image 1220 may differ depending on the user's eyesight. According to an embodiment, the image processing module 231 may display the FOV image 1200 in time order to play a FOV video.

Even though a video includes a shaken image, the display device 200 may sense the movement of the shaken image and may measure the degree of movement to rearrange coordinates, and thus the display device may display an image similar to an image without shaking, on the display 240. Furthermore, the display device 200 may display an image similar to an image without shaking, on the display, by changing coordinates of FOV or by extending the FOV to extract a common area from the temporally continuous image. Moreover, the display device 200 may play a video without shaking, using an image of the corrected FOV on the display 240.

According to an embodiment of the present disclosure, a camera device may include a capture unit including a plurality of optical modules separately capturing an omnidirectional subject depending on a specified angle to generate a plurality of split images, and a processor generating the plurality of images captured by the capture unit as an omnidirectional image. The processor may be configured to determine shaking of the omnidirectional image and to correct and rearrange a coordinate axis of the omnidirectional image when it is determined that the shaking of the omnidirectional image is present.

According to an embodiment of the present disclosure, the processor may be configured to stitch the boundary of the split images transmitted from the capture unit to generate a spherical omnidirectional image, and the image correction module may be configured to correct the coordinate axis of the spherical omnidirectional image.

According to an embodiment of the present disclosure, the processor may be configured to spread the spherical omnidirectional image to generate a planar omnidirectional image and to store the planar omnidirectional image in a memory or to transmit the planar omnidirectional image to the outside.

According to an embodiment of the present disclosure, the camera device may further include a sensor unit sensing movement of the camera device. The processor may be configured to determine the shaking of the omnidirectional image based on information about the movement received from the sensor unit and to correct the omnidirectional image depending on the determined shaking.

According to an embodiment of the present disclosure, the processor may be configured to determine the shaking of the omnidirectional image by comparing omnidirectional images obtained by temporally continuously capturing the omnidirectional subject and to correct the omnidirectional image depending on the determined shaking.

According to an embodiment of the present disclosure, the processor may be configured to determine the shaking by comparing pixel values of a plurality of coordinates in the omnidirectional images obtained by temporally continuously capturing the omnidirectional subject.

According to an embodiment of the present disclosure, the processor may be configured to determine the shaking by comparing a subject without movement in the omnidirectional images obtained by temporally continuously capturing the omnidirectional subject.

According to an embodiment of the present disclosure, a display device may include an input device sensing an input of a user, a display, and a processor generating FOV information corresponding to the input of the user via the input device and displaying an FOV image corresponding to the FOV information in the omnidirectional image on the display. The processor is configured to determine shaking of the omnidirectional image and to correct at least one of the FOV information and the omnidirectional image to generate the FOV image, when it is determined that the shaking of the omnidirectional image is present.

According to an embodiment of the present disclosure, the display device may be a HMD, and the input of the user may be the movement direction of a head. The processor may be configured to generate FOV information corresponding to the gaze direction.

According to an embodiment of the present disclosure, the processor may be configured to determine the shaking of the omnidirectional image, using movement information of the omnidirectional image included in metadata of the omnidirectional image and to perform the correction depending on the determined shaking.

According to an embodiment of the present disclosure, the processor may be configured to determine the shaking of the omnidirectional image by comparing omnidirectional images obtained by temporally continuously capturing the omnidirectional subject and to perform the correction depending on an amount of the determined shaking.

According to an embodiment of the present disclosure, the processor may be configured to determine the shaking by comparing pixel values of a plurality of coordinates in the omnidirectional images obtained by temporally continuously capturing the omnidirectional subject.

According to an embodiment of the present disclosure, the processor may be configured to determine the shaking by comparing a subject without movement in the omnidirectional images obtained by temporally continuously capturing the omnidirectional subject.

According to an embodiment of the present disclosure, the processor may be configured to perform the correction for rearranging a coordinate axis of the omnidirectional image depending on the shaking of the omnidirectional image.

According to an embodiment of the present disclosure, the processor may be configured to perform the correction for changing coordinates of FOV included in the FOV information depending on the shaking of the omnidirectional image.

According to an embodiment of the present disclosure, the processor may be configured to enlarge FOV included in the FOV information depending on the shaking of the omnidirectional image and to perform the correction for extracting a common area of the enlarged FOV in the omnidirectional image captured temporally continuously.

According to an embodiment of the present disclosure, a method of correcting shaking of an image may include generating FOV information corresponding to a movement direction of a head input via an input device, determining shaking of an omnidirectional image, correcting at least one of the FOV information of the omnidirectional image and the omnidirectional image, when the shaking of the omnidirectional image is sensed, and generating an FOV image corresponding to the FOV information in the corrected omnidirectional image.

According to an embodiment of the present disclosure, the determining of the shaking of the omnidirectional image may include determining the shaking of the omnidirectional image, using movement information of the omnidirectional image included in metadata of the omnidirectional image.

According to an embodiment of the present disclosure, the determining of the shaking of the omnidirectional image may include determining the shaking of the omnidirectional image by comparing omnidirectional images obtained by temporally continuously capturing the omnidirectional subject.

According to an embodiment of the present disclosure, the correcting of the at least one of the FOV information of the omnidirectional image and the omnidirectional image may include rearranging a coordinate axis of the omnidirectional image.

According to an embodiment of the present disclosure, the correcting of the at least one of the FOV information of the omnidirectional image and the omnidirectional image may include changing coordinates of FOV included in the FOV information.

According to an embodiment of the present disclosure, a system may include a camera device generating an omnidirectional image, an input device sensing an input of a user, a display, and a processor generating FOV information corresponding to the input of the user via the input device and displaying an FOV image corresponding to the FOV information in the omnidirectional image on the display. The processor may include a display device configured to determine shaking of the omnidirectional image and to correct at least one of the FOV information and the omnidirectional image to generate the FOV image, when it is determined that the shaking of the omnidirectional image is present.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., a processor), may cause the one or more processors to perform a function corresponding to the instruction. The computer-readable storage media, for example, may be a memory.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a camera configured to separately capture an omnidirectional subject depending on a specified angle to generate a plurality of split images, and configured to generate an omnidirectional image from capturing all orientations with respect to a specified location by using the generated plurality of split images;
a memory configured to store the generated omnidirectional image;
an input device configured to sense an input of a user;
a display; and
a processor configured to generate field of view (FOV) information corresponding to the input of the user via the input device and configured to display an FOV image corresponding to the FOV information in the omnidirectional image on the display, wherein the processor is configured to:
determine shaking of the omnidirectional image by comparing omnidirectional images obtained by temporally continuously capturing the omnidirectional subject; and
when it is determined that the shaking of the omnidirectional image is present, correct at least one of the FOV information and the omnidirectional image to generate the FOV image depending on an amount of the determined shaking.

2. The electronic device of claim 1, wherein the processor is configured to:
determine the shaking of the omnidirectional image, using movement information of the omnidirectional image included in metadata of the omnidirectional image; and
perform the correction depending on the determined shaking.

3. The electronic device of claim 1, wherein the processor is configured to:
determine the shaking by comparing pixel values of a plurality of coordinates in the omnidirectional images obtained by temporally continuously capturing the omnidirectional subject.

4. The electronic device of claim 1, wherein the processor is configured to:
determine the shaking by comparing a subject without movement in the omnidirectional images obtained by temporally continuously capturing the omnidirectional subject.

5. The electronic device of claim 1, wherein the processor is configured to:
perform the correction for rearranging a coordinate axis of the omnidirectional image depending on the shaking of the omnidirectional image.

6. The electronic device of claim 1, wherein the processor is configured to:
perform the correction for changing coordinates of FOV included in the FOV information depending on the shaking of the omnidirectional image.

7. The electronic device of claim 1, wherein the processor is configured to:
enlarge FOV included in the FOV information depending on the shaking of the omnidirectional image; and
perform the correction for extracting a common area of the enlarged FOV in the omnidirectional image captured temporally continuously.

8. A method of correcting shaking of an image, the method comprising:
generating FOV information corresponding to a movement direction of a head input via an input device;
determining shaking of an omnidirectional image from capturing all orientations;
correcting at least one of the FOV information of the omnidirectional image and the omnidirectional image, when the shaking of the omnidirectional image is sensed; and
generating an FOV image corresponding to the FOV information in the corrected omnidirectional image,
wherein the determining of the shaking of the omnidirectional image includes determining the shaking of the omnidirectional image by comparing omnidirectional images obtained by temporally continuously capturing the omnidirectional subject.

9. The method of claim 8, wherein the determining of the shaking of the omnidirectional image includes:
determining the shaking of the omnidirectional image, using movement information of the omnidirectional image included in metadata of the omnidirectional image.

10. The method of claim 8, wherein the comparing of the omnidirectional image captured temporally continuously includes:
comparing pixel values of a plurality of coordinates in the omnidirectional images obtained by temporally continuously capturing the omnidirectional subject.

11. The method of claim 8, wherein the comparing of the omnidirectional image captured temporally continuously includes:
comparing a subject without movement in the omnidirectional images obtained by temporally continuously capturing the omnidirectional subject.

12. The method of claim 8, wherein the correcting of the at least one of the FOV information of the omnidirectional image and the omnidirectional image includes:
rearranging a coordinate axis of the omnidirectional image.

13. The method of claim 8, wherein the correcting of the at least one of the FOV information of the omnidirectional image and the omnidirectional image includes:
changing coordinates of FOV included in the FOV information.

* * * * *